United States Patent
Clay (10) Patent No.: US 12,531,860 B2
(45) Date of Patent: Jan. 20, 2026

(54) FILTERING UPDATED ALIAS INFORMATION

(71) Applicant: Yokogawa Electric Corporation, Tokyo (JP)

(72) Inventor: Patrick Clay, Frisco, TX (US)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 18/656,248

(22) Filed: May 6, 2024

(65) Prior Publication Data

US 2025/0343791 A1 Nov. 6, 2025

(51) Int. Cl.
*H04L 9/40* (2022.01)

(52) U.S. Cl.
CPC ................ *H04L 63/0884* (2013.01)

(58) Field of Classification Search
CPC .................................................. H04L 63/0884
See application file for complete search history.

(56) References Cited

U.S. PATENT DOCUMENTS

2008/0307429 A1* 12/2008 Fontaine ................ G06F 8/63
 719/312
2019/0334860 A1* 10/2019 Albrecht ............. H04L 61/5076

\* cited by examiner

*Primary Examiner* — Huan V Doan
(74) *Attorney, Agent, or Firm* — Gray Ice Higdon (57) ABSTRACT

Methods, systems, and apparatus are disclosed for implementing a request for filtered updated resources associated with aliases. A CPC may be configured to request a filtered updated list of registered aliases associated with one or more resources. The updated list may be filtered based on a state of a DCN, on which the CPC is hosted. For example, the updated list may be filtered based on a timestamp associated with receipt of a previous list, based on a group the DCN is associated with, based on manufacturers, and/or based on security level (associated with the DCN, and/or associated with updates).

20 Claims, 6 Drawing Sheets

┌─────────────────────────────────────────────────────────────────┐
│  RECEIVE, FROM AN ALIAS SERVER OVER ONE OR MORE PROCESS         │
│  AUTOMATION NETWORKS, A LIST OF REGISTERED ALIASES,             │
│  INCLUDING: RESOURCES HOSTED BY OTHER DCNS ON THE PROCESS       │
│  AUTOMATION NETWORK, AND HUMAN-READABLE ALIASES ASSIGNED        │
│                    TO THE RESOURCES.                            │
│                          502                                    │
└─────────────────────────────────────────────────────────────────┘
                                ↓
┌─────────────────────────────────────────────────────────────────┐
│  RECORD, IN MEMORY, ONE OR MORE ASPECTS OF A STATE OF THE DCN   │
│     WHEN THE DCN RECEIVES THE LIST OF REGISTERED ALIASES.       │
│                          504                                    │
└─────────────────────────────────────────────────────────────────┘
                                ↓
┌─────────────────────────────────────────────────────────────────┐
│    FORMULATE A REQUEST FOR AN UPDATED LIST OF REGISTERED        │
│   ALIASES, WHEREIN THE REQUEST INCLUDES AN INDICATION OF ONE    │
│   OR MORE OF THE ASPECTS OF THE STATE OF THE DCN THAT CAUSE     │
│   THE ALIAS SERVER TO RETURN LESS THAN ALL REGISTERED ALIASES.  │
│                          506                                    │
└─────────────────────────────────────────────────────────────────┘
                                ↓
┌─────────────────────────────────────────────────────────────────┐
│    TRANSMIT, TO THE ALIAS SERVER OVER ONE OR MORE OF THE        │
│   NETWORKS, THE REQUEST FOR AN UPDATED LIST OF REGISTERED       │
│                         ALIASES.                                │
│                          508                                    │
└─────────────────────────────────────────────────────────────────┘
                                ↓
┌─────────────────────────────────────────────────────────────────┐
│   RECEIVE, FROM THE ALIAS SERVER OVER ONE OR MORE OF THE        │
│  NETWORKS, THE UPDATED LIST OF REGISTERED ALIASES, WHEREIN      │
│  THE UPDATED LIST OF REGISTERED ALIASES EXCLUDES ONE OR MORE    │
│   RESOURCES WITH CORRESPONDING ALIASES THAT SATISFY ONE OR      │
│     MORE CRITERIA ASSOCIATED WITH THE STATE OF THE DCN.         │
│                          510                                    │
└─────────────────────────────────────────────────────────────────┘
```

FILTERING UPDATED ALIAS INFORMATION

BACKGROUND

Process automation facilities may include a myriad of sensors, actuators, and distributed control nodes (DCNs) that cooperate to perform a variety of different tasks, including managing process control loops. Tracking these various components can be cumbersome. Human-friendly aliases can be assigned to individual components, e.g., using an alias server such as a Global Discovery Server (GDS), so that humans are better able to manage the many components in an intuitive way.

SUMMARY

Implementations are described herein for decreasing network traffic and/or volume between process automation nodes such as cross-platform clients (CPCs) hosted by DCNs and GDSs. More particularly, but not exclusively, techniques are described herein for filtered searches of alias information in order to reduce the size of data exchanged between process automation nodes. In some implementations, this filtering may be based on time. For instance, a GDS may record the time at which an alias is registered. Clients seeking alias updates from the GDS can specify a time, e.g., that they last received an alias update, and the GDS may return only those aliases that have been modified (e.g., added, deleted) since the specified time. As a consequence, the data returned by the GDS will not include alias information that the client already possesses, and the amount of data transferred will decrease. Given the sheer number of nodes typical in a process automation facility, as well as the frequency at which aliases change, this decrease in transmitted data size may significantly reduce the burden on the process automation network.

In various implementations, a CPC hosted on a DCN in a process automation facility is configured to receive, from an alias server over one or more process automation networks, a list of registered aliases. In various implementations, the list of registered aliases includes resources hosted by other DCNs on the process automation network, and human-readable aliases assigned to the resources. In various implementations, the CPC is configured to record, in memory, one or more aspects of a state of the DCN when the DCN receives the list of registered aliases. In various implementations, the CPC is configured to formulate a request for an updated list of registered aliases. In various implementations, the request includes an indication of one or more of the aspects of the state of the DCN that cause the alias server to return less than all registered aliases. In various implementations, the CPC is configured to transmit, to the alias server over one or more of the networks, the request for an updated list of registered aliases. In various implementations, the CPC is configured to receive, from the alias server over one or more of the networks, the updated list of registered aliases. In various implementations, the updated list of registered aliases excludes one or more resources with corresponding aliases that satisfy one or more criteria associated with the state of the DCN.

In various implementations, one or more aspects of the state of the DCN include a time at which the DCN received the list of registered aliases, and the one or more criteria include resources with corresponding aliases that are unaltered since the time. In various implementations, the updated list of registered aliases includes registered aliases modified since the time associated with receiving the list of registered aliases. In various implementations, the updated list of registered aliases includes registered aliases added since the time associated with receiving the list of registered aliases. In various implementations, the updated list of registered aliases includes registered aliases deleted since the time associated with receiving the list of registered aliases. In various implementations, subsequent to receiving the list of registered aliases, one or more selected registered aliases are assigned to a resource hosted by another DCN on the process automation network. In various implementations, the one or more selected registered aliases are included in the updated list. In various implementations, subsequent to receiving the list of registered aliases, one or more of the registered aliases are unassigned from one or more of the resources hosted by the other DCNs. In various implementations, the one or more unassigned registered aliases are included in the updated list.

In various implementations, features disclosed herein may be implemented using one or more processors. In various implementations, features disclosed herein may be implemented using a system comprising one or more storage devices storing instructions and one or more processors that are operable to execute the instructions to cause the one or more processors to perform operations associated with disclosure herein. In some implementations, features disclosed herein may be implemented using a non-transitory computer-readable medium storing software comprising instructions executable by one or more computers which, upon such execution, cause the one or more computers to perform operations associated with disclosure herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Implementations are described herein for decreasing network traffic and/or volume between process automation nodes such as CPCs (hosted by DCNs) and GDSs. More particularly, but not exclusively, techniques are described herein for enabled filtered searches of alias information in order to reduce the size of data exchanged between process automation nodes. In some implementations, this filtering may be based on time.

A DCN may include one or more input-output (I/O) channels associated with various types of equipment in a process automation facility. Output channels may be associated with output devices such as actuators, valves, dampers, etc. Input channels may be associated with input devices such as various types of sensors, flow meters, compute nodes, etc. A DCN may drive output channel(s) controlling output device(s) based on data received from one or more data sources, such as one or more remote DCNs (or components thereof) to which the DCN is subscribed.

Process automation equipment such as DCNs may be configured to communicate with other process automation equipment using various open (e.g., non-proprietary) and/or standardized communication protocols, which will be described herein as "cross-platform." Cross-platform communication protocols may be governed by various regulations and/or standards, such as the Open Platform Communication (OPC) uniform architecture (UA). Thus, while in various examples described herein, a DCN is described as hosting one or more "OPC UA clients" and/or one or more "OPC UA servers," this is not meant to be limiting. DCNs may host other types of cross-platform clients and/or cross-platform servers; OPC UA is just one example.

DCNs may host various cross-platform clients (CPCs) and/or cross-platform servers (CPSs), which may use features of a DCN (e.g., I/O channels) to monitor and/or control various process automation equipment. While CPCs/CPSs may be capable of monitoring and/or controlling equipment using IP addresses, serial numbers, etc., CPCs/CPSs may also be capable of monitoring and/or controlling equipment using aliases, e.g., human-friendly names enabling humans to more intuitively identify and manage components. Accordingly, aliases may be associated with various components of a process automation facility, and may include readily interpretable strings of characters, such as "Valve1" or "Sensor2 I/OChannel". These aliases may be generated with or without user input. For example, these aliases may be automatically generated by a component within a process automation network and/or may be generated based on user input received by a component in communication with the process automation network.

In some instances, an alias may change. For example, an alias may be altered, reassigned, orphaned, and/or deleted. These changes may be responsive to various events, such as components being added, removed, and/or replaced. Consequently, there is a frequent communication and/or synchronization between GDSs and CPCs to address these changes. While CPCs may use a "FindAlias" method to retrieve a list of nodes and corresponding registered aliases from a GDS, much of the information returned may be redundant because it has not changed since the most recent "FindAlias" exchange.

Techniques described herein enable filtered searches of alias information to reduce the size of data exchanged between process automation nodes. Filters may be based on temporal considerations (e.g., time frames), attributes of components/equipment (e.g., individually or by groups), security, manufacturer, locations, etc., GDSs may record resources (e.g., sensors or actuators managed by CPSs) and aliases assigned to those resources. GDSs may also record other information, such as timestamps, grouping information, etc., associated with receipt and/or recordation of resources and aliases.

As an example, CPCs seeking alias updates from the GDS can specify a time, e.g., a timestamp generated with the CPC last received an alias update. The GDS may return only those aliases that have been modified (e.g., added, deleted) since the specified time, e.g. FindAlias("[^]addedSince 2023-01-02T14:40:00"), or e.g. FindAlias("[^]deletedSince 2023-01-02T14:40:00"). As a consequence, the data returned by the GDS will not include alias information that the CPC already possesses. Accordingly, the amount of data transferred will decrease. Given the sheer number of components typical in a process automation facility, as well as the frequency at which aliases change, this decrease in transmitted data size may significantly reduce the burden on the process automation network.

In various implementations, a CPC may record a state of a DCN on which the CPC is hosted (e.g., temporal state, active state, grouping state, etc.) in addition to alias updates (e.g., resources and associated aliases). The CPC may use this recorded information to request alias updates, e.g., relative to a previous alias list and/or relative to a state of the DCN at the time the previous alias list was received.

In some implementations, a CPC may be configured to receive a list of registered aliases from a GDS, the list including resources hosted by DCNs on the process automation network and aliases assigned to the resources. The received list of registered aliases and a state of the DCN on which the CPC is hosted may be recorded. Subsequently, a request for an updated list of registered aliases may be formulated, the request indicating aspects of a state of the DCN. The indicated aspects of the state of the DCN included in the request may cause the GDS to return less than all registered aliases. This may avoid return of registered aliases that have not changed relative to a previous request, and thus reduce transmissions over the process automation network. The CPC may transmit the formulated request to the GDS. In response, the CPC may receive an updated list of registered aliases (excluding one or more resources with corresponding aliases satisfying one or more criteria associated with the state of the DCN) from the GDS.

The criteria associated with the state of the DCN—which when satisfied, may cause resource(s) with corresponding aliases to be excluded from an updated list—may include a temporal criteria corresponding to one or more components (e.g., a timestamp associated with a previous request or receipt for information), active state criteria corresponding to one or more component activities, performance criteria corresponding to one or more component performance measures, security criteria corresponding to one or more component security levels, grouping criteria corresponding to an organization and/or hierarchy of one or more components, etc. Using temporal criteria as an example, the aspects of the state of the DCN (indicated in a request for an updated list) may include a timestamp generated when the DCN received a previous list of registered aliases. The criteria may be satisfied when resources with corresponding aliases remain unaltered since that time.

The updated list of aliases may include registered aliases that are modified, added, and/or deleted since the time associated with receiving a previous list of registered aliases. For example, subsequent to receiving the list of registered aliases, one or more selected registered aliases may be assigned to a resource hosted by another DCN on the process automation network and may be included in the updated list. As another example, subsequent to receiving the list of registered aliases, one or more of the registered aliases may be unassigned from one or more of the resources hosted by the other DCNs and may be included in the updated list.

Figure 1:
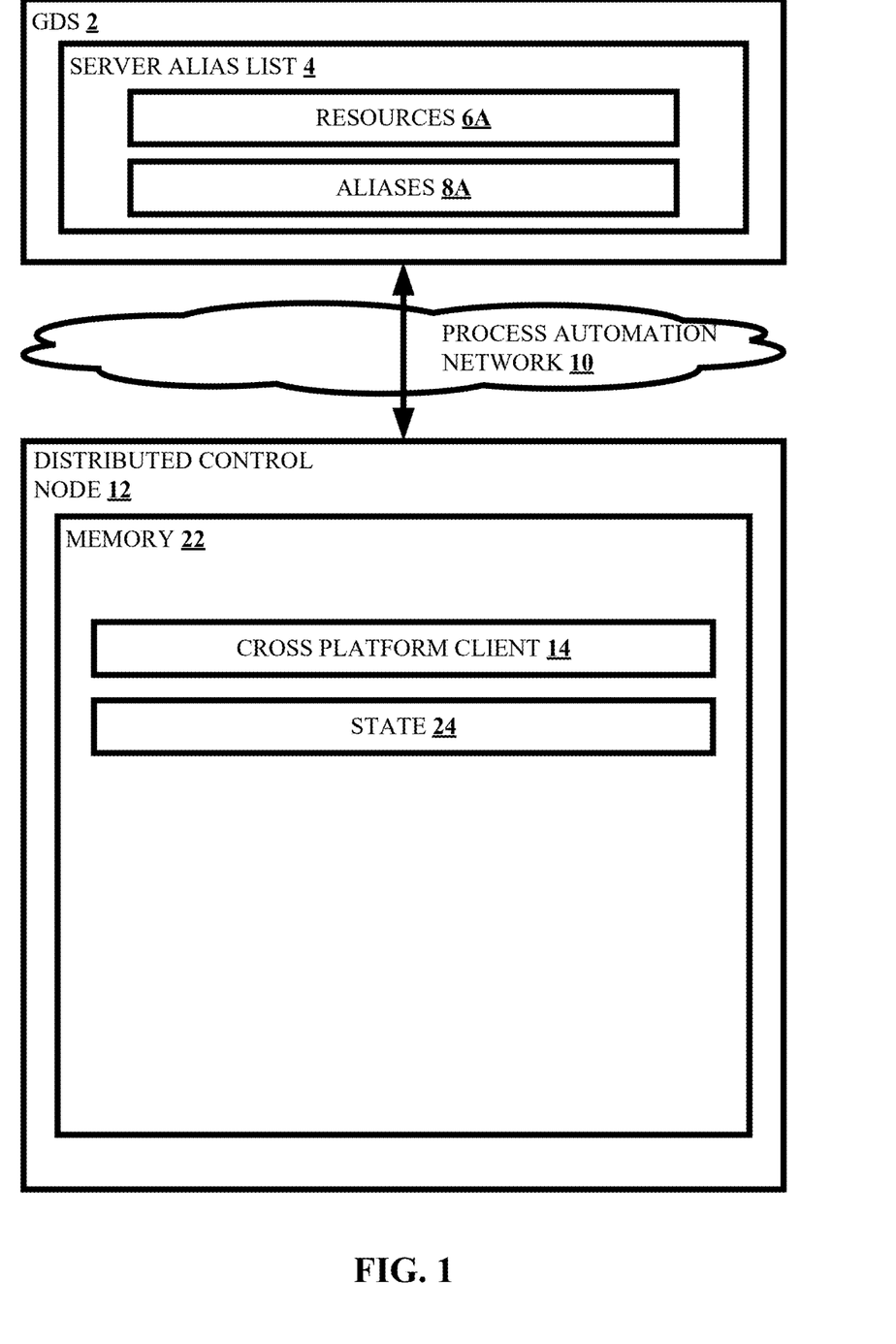
FIG. 1 schematically depicts an example environment in which selected aspects of the present disclosure may be implemented.

FIG. 1 schematically depicts an example environment in which selected aspects of the present disclosure may be implemented, in accordance with various embodiments. A GDS 2 includes a server alias list 4, which includes resources 6A and corresponding aliases 8A. As discussed herein, these resources may include components within a process automation network, and these aliases may include human-friendly characterizations of those resources, e.g., instead of a resource being characterized by default as a e.g., hexadecimal code "7B316" or with an otherwise cryptic identifier (e.g., opc.tcp://10.0.1.1:4840;ns=5;i=5242), the resource may be characterized as "Sensor7".

The GDS 2 may communicate over a process automation network 10 with DCN 12. DCN 12 may include memory 22. Memory 22 may store instructions for executing CPC 14. Memory 22 may also store one or more states associated with CPC 14. These states may reflect power, performance, security, timestamps, groupings, etc., associated with operations and/or communication of information.

Figure 2:
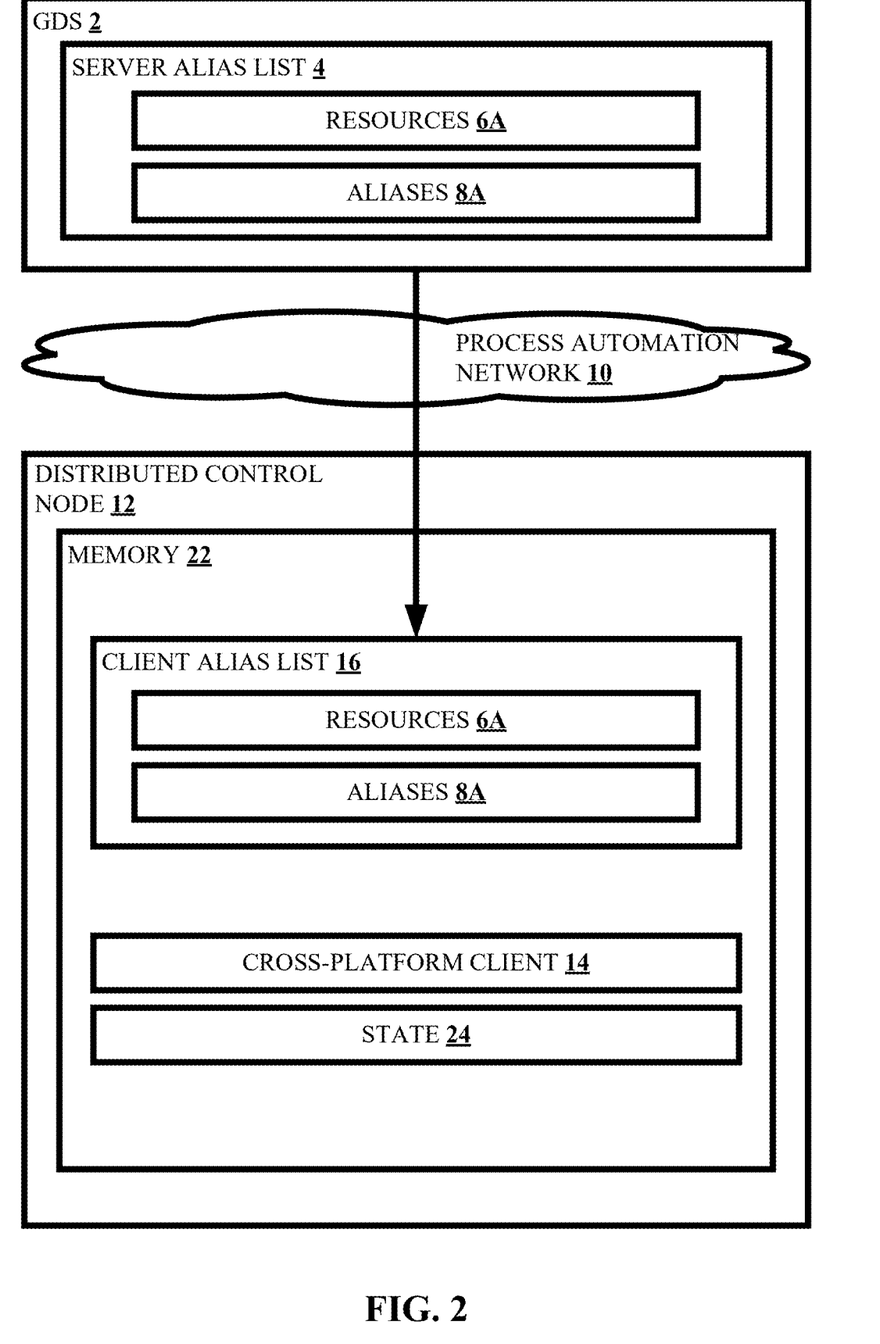
FIG. 2 schematically depicts an example environment in which an alias list is received from a GDS by a CPC hosted on a DCN.

FIG. 2 depicts GDS 2 transmitting server alias list 4 to DCN 12. Specifically, GDS 2 may transmit server alias list 4 that includes the resources 6A and aliases 8A to CPC 14. Accordingly, client alias list 16 may include identical information to that received from GDS 2, such as resources 6A and aliases 8A, or may include alternative information. In some implementations, client alias list 16 may contain information that is generated and/or derived based on information transmitted from GDS 2, but that is not identical to that information. For instance, client alias list 16 may include information associated with state 24 (included in memory 22), and/or modify information that is received based on information associated with state 24.

Accordingly, client alias list 16 may reflect resources 6A and/or 8A as received from GDS 2, and/or may reflect resources 6A and/or aliases 8A as associated with timestamp information, grouping information, performance information, manufacturer information, security information, etc. For example, client alias list 16 may include resources 6A and/or aliases 8A, and information indicating a time when they were received from GDS 2, a timespan since their last known update, an expected expiration time, etc. Similarly, client alias list 16 may include resources 6A and/or aliases 8A, and information indicating associated security protocols, e.g., CPC 14 permissions indicating whether GDS 2 is configured to provide updated information responsive to a request. As another example, client alias list 16 may include resources 6A and/or aliases 8A, and information indicating organization and/or hierarchy associated with resources 6A, aliases 8A, and/or CPC 14.

Figure 3:
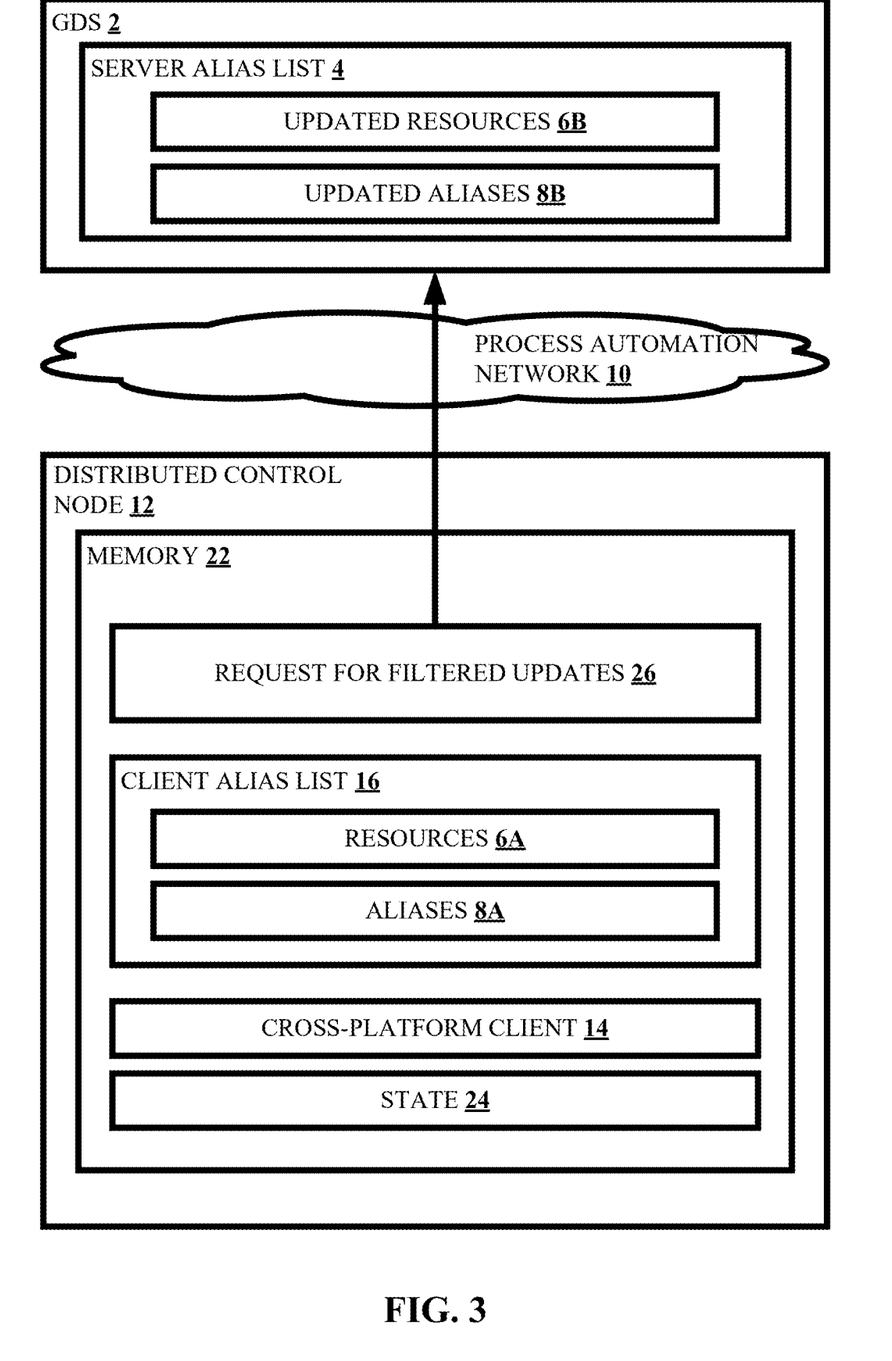
FIG. 3 schematically depicts an example environment in which a request for filtered information is transmitted from a CPC to a GDS.

FIG. 3 depicts CPC 14 transmitting a request for filtered updates 26 over process automation network 10 to GDS 2. As discussed previously, associations between resources and aliases may frequently change. For example, resources may and/or aliases may be added, removed, modified, or replaced. Accordingly, updates are necessary to ensure that CPCs included in a process automation network can communicate information effectively. Relative to FIG. 2, resources and aliases on server alias list 4 have been updated. Accordingly, server alias list 4 now includes updated resources 6B and updated aliases 8B. Updated resources 6B and updated aliases 8B may include both updated and previously known resources and aliases, or may only include updated (e.g., the most current reflection of) resources and aliases. Due to one or more factors, such as communication protocols, security permissions, network hardware, etc., CPC 14 may only be configured to receive updates corresponding to updated resources 6B and updated aliases 8B via a request for updates to GDS 2.

While an unfiltered request for updates may result in GDS 2 transmitting all available information in server alias list 4, a filtered request for updates may result in GDS 2 transmitting a subset of all available information in server alias list 4. For example, the request for filtered updates 26 may request that updates be filtered based on temporal considerations. Put another way, the request for filtered updates 26 may request only updated resources 6B and updated aliases 8B that have been updated since a specified time. The specified time may correspond to a last known receipt of information from GDS 2 by CPC 14. Accordingly, a filtered request for updates 26 may conserve network resources by reducing data communicated between GDS 2 and CPC 14, based on the CPC 14's request for filtered updates 26 requesting only a tailored subset of data available on GDS 2's server alias list 4.

In some implementations, the filtered request for updates 26 may be formulated based on aspects of state 24 in memory 22. State 24 may reflect one or more states of information associated with DCN 12 (including CPC 14). For example, state 24 may reflect temporal considerations, such as times when information was communicated via DCN 12, and/or times when DCN 12 was inactive or active. State 24 may also reflect group considerations, such as whether DCN 12 is assigned to a group, who manufactured DCN 12, what process loop(s) DCN 12 is involved in, what security level DCN 12 has, process control loops that DCN 12 is involved in, etc. Accordingly, filtered request for updates 26 may be formulated based on one or a plurality aspects of state 24. As an example, filtering may be based on resources involved in DCN 12's process loop, thus filtering out resources and aliases that are not involved in DCN 12's process loop (and hence may not be relevant to CPC 14).

Figure 4:
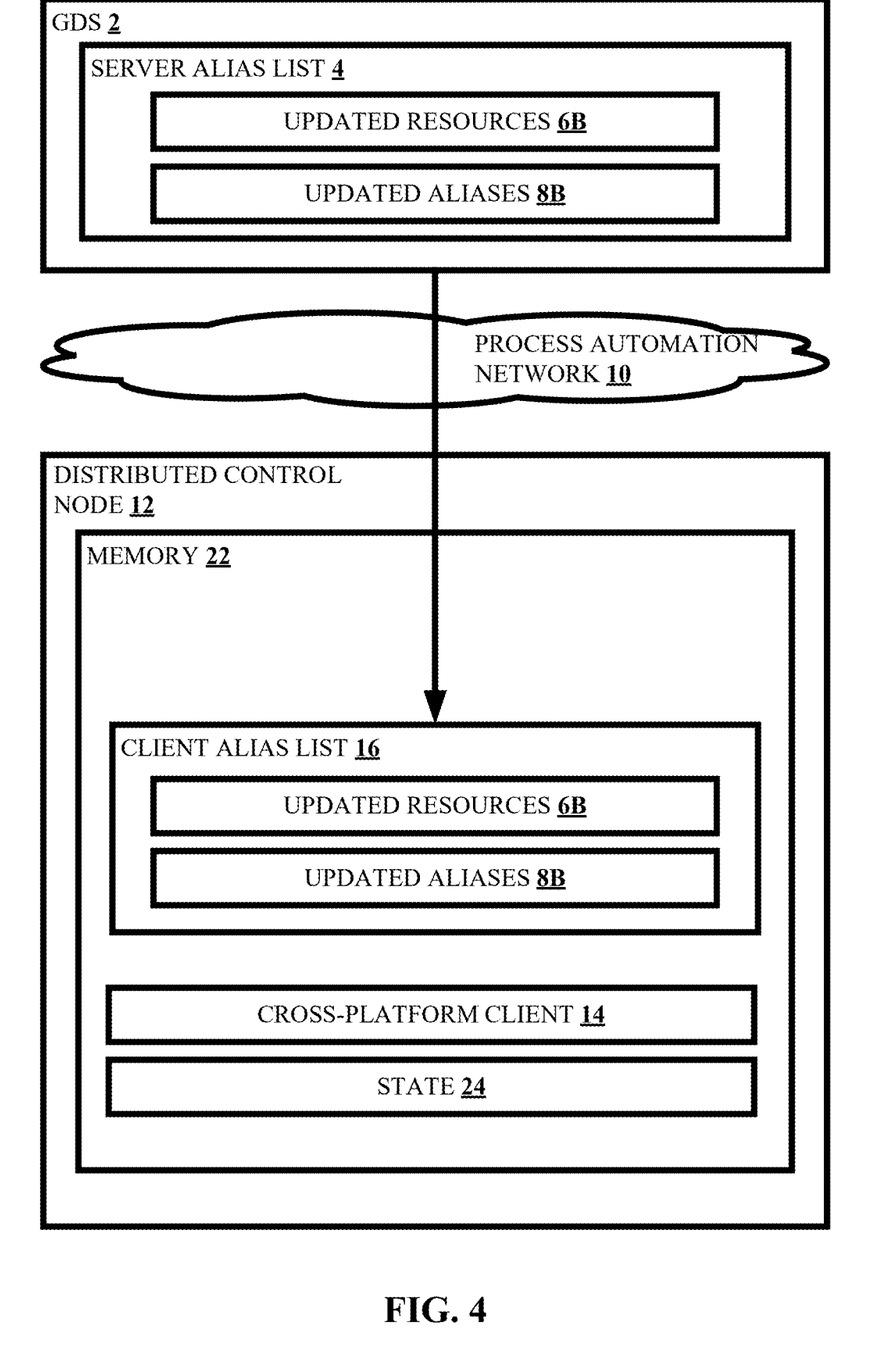
FIG. 4 schematically depicts an example environment in which an updated alias list is received from GDS hosted by a CPC hosted on a DCN.

FIG. 4 depicts GDS 2 transmitting updated resources 6B and updated aliases 8B to DCN 12. As discussed with regard to FIG. 3, CPC 14 may send a request for filtered updates 26 to GDS 2, wherein the request is filtered based on various considerations, such as time frames, groupings, etc. In FIG. 4, client alias list 16 is depicted as having received, from GDS 2 and over process automation network 10, updated resources 6B and updated aliases 8B. As discussed previously, resources and aliases included in client alias list 16 may be based on, and in some implementations may be different from, resources and aliases included in server alias list 4. For example, if the request for filtered updates 26 (referenced in FIG. 3) were to filter updates based on grouping (e.g., by manufacturer process control loop membership, facility section or role, etc.) and time, then although updates may have temporally occurred since receipt of previous information by CPC 14 from GDS 2, no updates will be transmitted from GDS 2 to CPC 14 if the updates do not relate to the grouping (e.g., related to the manufacturer, process control loop membership, etc.).

Accordingly, resources can be conserved using filtered update requests, as GDS 2 may not need to process a compilation of resources and aliases filtered out by the request for filtered updates 26. Further, resources and aliases filtered out may not need to be communicated over process automation network 10, e.g., reducing strain on available bandwidth. Additionally, CPC 14 may not need to locally filter information included in an update transmission from GDS 2, as the information included should only include the desired updated resources and aliases. Accordingly, many benefits associated with resource conservation are associated with implementations disclosed herein.

Figure 5:
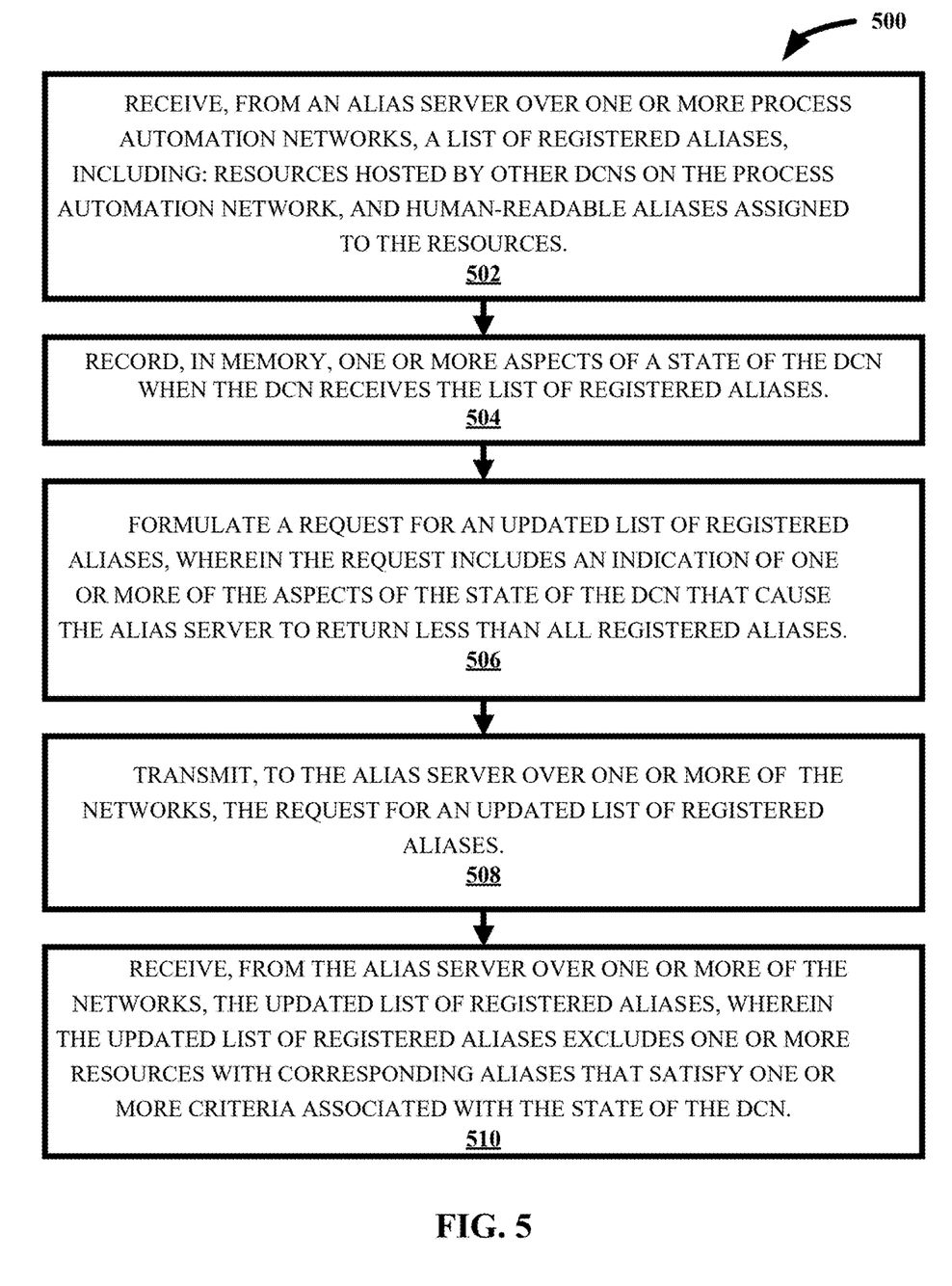
FIG. 5 schematically depicts an example method for performing aspects of the present disclosure.

FIG. 5 includes a flowchart illustrating an example method 500 for performing aspects of the present disclosure. For convenience, the operations of the flow chart are described with reference to a system that performs the operations. This system may include various components of various computer systems. Moreover, while operations of method 500 are shown in a particular order, this is not meant to be limiting. One or more operations may be reordered, omitted, and/or added. Methods, systems, and apparatuses disclosed herein, including but not limited to method 500, may be implemented using one or more processors.

At block 502, the system receives, from an GDS over one or more process automation networks, a list of registered aliases. The list of registered aliases may include resources hosted by other DCNs on the process automation network and human-readable aliases assigned to the resources.

At block 504, the system records one or more aspects of a state of the DCN when the DCN receives the list of registered aliases. Recordation may be made in a memory that is local to the DCN or that is remote. In some implementations, the state of the DCN may include temporal states, manufacturing states, security states, etc. For example, the state of the DCN may include a temporal state, and the aspects recorded may be a timestamp reflecting the temporal state during which the list of registered aliases (discussed above, in block 502) are received.

At block 506, the system formulates a request for an updated list of registered aliases. The request may include an indication of one or more of the aspects of the state of the DCN that cause the GDS to return less than all registered aliases. For example, the request may include a temporal indication (e.g., based on a timestamp associated with previously received information) indicating that that only updates subsequent to a specific time are requested. As discussed previously, other indications may additionally or alternatively be included. These indications may result in a subset of a total available list of registered aliases being transmitted. In some implementations, these indications may result in a request which yields no updates (either based on a general lack of updates, or based on updates failing to satisfy criteria associated with the indications included in the request).

At block 508, the system transmits, to the GDS over one or more of the networks, the request for an updated list of registered aliases.

At block 510, the system receives, from the GDS over one or more of the networks, the updated list of registered aliases. The updated list of registered aliases excludes one or more resources with corresponding aliases that satisfy one or more criteria associated with the state of the DCN. As discussed above, indications associated with a state of a DCN may include, e.g., temporal indications. One or more resources with corresponding aliases, of a total list of registered aliases, may be excluded from an updated list of registered aliases received by a CPC from an GDS based on the once or more resources satisfying, e.g., temporal criteria. Put another way, if the one or more resources with corresponding aliases are unaltered relative to a previous receipt of a list of registered aliases by the CPC, they may satisfy a temporal criteria of being unchanged over a temporal period, and thus may be excluded from the updated list. This avoids unnecessary processing and transmission of data by the process automation network and/or components included therein.

In some implementations, the updated list of registered aliases includes registered aliases added, deleted, and/or modified since the time associated with receiving the list of registered aliases. As discussed in block 502, the system may receive an initial list of registered aliases. In some implementations, subsequent to receiving the list of registered aliases, one or more selected registered aliases are assigned to, or unassigned from, a resource hosted by another DCN on the process automation network. As discussed in block 510, the system may receive an updated list of registered aliases, and in some implementations, if subsequent to receiving the list of registered aliases, one or more selected registered aliases are assigned to a resource hosted by another DCN, the one or more selected registered aliases will be included in the updated list. Alternatively, in some implementations, if subsequent to receiving the list of registered aliases, one or more selected registered aliases are unassigned from a resource hosted by another DCN, the one or more selected registered aliases will be included in the updated list.

Figure 6:
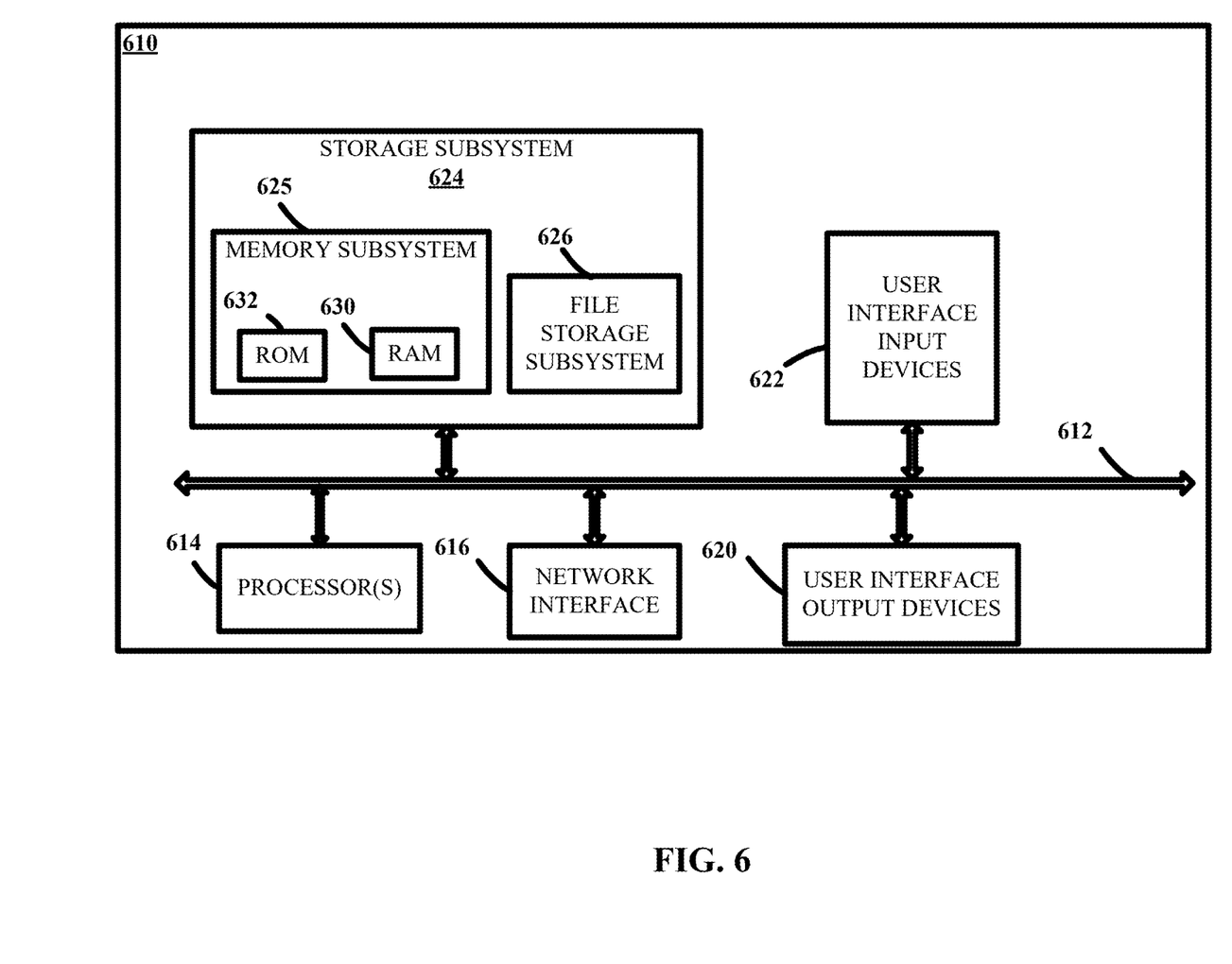
FIG. 6 schematically illustrates an example computer architecture on which selected aspects of the present disclosure may be implemented.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method depicted in FIG. 5, as well as to implement various aspects depicted in FIGS. 1-4.

These software modules are generally executed by processor 614 alone or in combination with other processors. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD- ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6. Techniques disclosed herein may be implemented by one or more processors, systems including storage devices with instructions executable by one or more processors, and/or non-transitory computer readable mediums storing instructions executable by one or more computers.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

I claim:

1. A method implemented by a cross-platform client hosted on a distributed control node (DCN) in a process automation facility, the method implemented using one or more processors and comprising:
receiving, from an alias server over one or more process automation networks, a list of registered aliases, wherein the list of registered aliases includes:
resources hosted by other DCNs on the process automation network, and
human-readable aliases assigned to the resources;
recording, in memory, one or more aspects of a state of the DCN when the DCN receives the list of registered aliases;
formulating a request for an updated list of registered aliases, wherein the request includes an indication of one or more of the aspects of the state of the DCN that cause the alias server to return less than all registered aliases;
transmitting, to the alias server over one or more of the networks, the request for an updated list of registered aliases; and
receiving, from the alias server over one or more of the networks, the updated list of registered aliases, wherein the updated list of registered aliases excludes one or more resources with corresponding aliases that satisfy one or more criteria associated with the state of the DCN.

2. The method of claim 1, wherein the one or more aspects of the state of the DCN include a time at which the DCN received the list of registered aliases, and the one or more criteria include resources with corresponding aliases that are unaltered since the time.

3. The method of claim 2, wherein the updated list of registered aliases includes registered aliases modified since the time associated with receiving the list of registered aliases.

4. The method of claim 2, wherein the updated list of registered aliases includes registered aliases added since the time associated with receiving the list of registered aliases.

5. The method of claim 2, wherein the updated list of registered aliases includes registered aliases deleted since the time associated with receiving the list of registered aliases.

6. The method of claim 1, wherein subsequent to receiving the list of registered aliases, one or more selected registered aliases are assigned to a resource hosted by another DCN on the process automation network.

7. The method of claim 6, wherein the one or more selected registered aliases are included in the updated list.

8. The method of claim 1, wherein subsequent to receiving the list of registered aliases, one or more of the registered aliases are unassigned from one or more of the resources hosted by the other DCNs.

9. The method of claim 8, wherein the one or more unassigned registered aliases are included in the updated list.

10. A system comprising:
one or more storage devices storing instructions; and
one or more processors that are operable to execute the instructions to cause the one or more processors to perform operations comprising:
receiving, from an alias server over one or more process automation networks including a cross-platform client hosted on a distributed control node (DCN), a list of registered aliases, wherein the list of registered aliases includes:
resources hosted by other DCNs on the process automation network, and
human-readable aliases assigned to the resources;
recording, in memory, one or more aspects of a state of the DCN when the DCN receives the list of registered aliases;
formulating a request for an updated list of registered aliases, wherein the request includes an indication of one or more of the aspects of the state of the DCN that cause the alias server to return less than all registered aliases;
transmitting, to the alias server over one or more of the networks, the request for an updated list of registered aliases; and
receiving, from the alias server over one or more of the networks, the updated list of registered aliases, wherein the updated list of registered aliases excludes one or more resources with corresponding aliases that satisfy one or more criteria associated with the state of the DCN.

11. The system of claim 10, wherein the one or more aspects of the state of the DCN include a time at which the DCN received the list of registered aliases, and the one or more criteria include resources with corresponding aliases that are unaltered since the time.

12. The system of claim 11, wherein the updated list of registered aliases includes registered aliases modified since the time associated with receiving the list of registered aliases.

13. The system of claim 11, wherein the updated list of registered aliases includes registered aliases added since the time associated with receiving the list of registered aliases.

14. The system of claim 11, wherein the updated list of registered aliases includes registered aliases deleted since the time associated with receiving the list of registered aliases.

15. The system of claim 10, wherein subsequent to receiving the list of registered aliases, one or more selected registered aliases are assigned to a resource hosted by another DCN on the process automation network.

16. The system of claim 15, wherein the one or more selected registered aliases are included in the updated list.

17. The system of claim 10, wherein subsequent to receiving the list of registered aliases, one or more of the registered aliases are unassigned from one or more of the resources hosted by the other DCNs.

18. The system of claim 17, wherein the one or more unassigned registered aliases are included in the updated list.

19. A non-transitory computer-readable medium storing software comprising instructions executable by one or more computers which, upon such execution, cause the one or more computers to perform operations comprising:
receiving, from an alias server over one or more process automation networks including a cross-platform client hosted on a distributed control node (DCN), a list of registered aliases, wherein the list of registered aliases includes:
resources hosted by other DCNs on the process automation network, and
human-readable aliases assigned to the resources;
recording, in memory, one or more aspects of a state of the DCN when the DCN receives the list of registered aliases;
formulating a request for an updated list of registered aliases, wherein the request includes an indication of one or more of the aspects of the state of the DCN that cause the alias server to return less than all registered aliases;
transmitting, to the alias server over one or more of the networks, the request for an updated list of registered aliases; and
receiving, from the alias server over one or more of the networks, the updated list of registered aliases, wherein the updated list of registered aliases excludes one or more resources with corresponding aliases that satisfy one or more criteria associated with the state of the DCN.

20. The non-transitory computer-readable medium of claim 19, wherein the one or more aspects of the state of the DCN include a time at which the DCN received the list of registered aliases, and the one or more criteria include resources with corresponding aliases that are unaltered since the time.

* * * * *